US009082244B2

(12) United States Patent
Gerstenkorn

(10) Patent No.: US 9,082,244 B2
(45) Date of Patent: Jul. 14, 2015

(54) METHOD OF CONTROLLING ACCESS TO AN AREA

(75) Inventor: Bernhard Gerstenkorn, Ebikon (CH)

(73) Assignee: Inventio AG, Hergiswil (CH)

( * ) Notice: Subject to any disclaimer, the term of this patent is extended or adjusted under 35 U.S.C. 154(b) by 1438 days.

(21) Appl. No.: 11/460,042

(22) Filed: Jul. 26, 2006

(65) Prior Publication Data

US 2007/0025314 A1 Feb. 1, 2007

(30) Foreign Application Priority Data

Jul. 28, 2005 (EP) .................................... 05106997

(51) Int. Cl.
*H04B 7/216* (2006.01)
*G07C 9/00* (2006.01)

(52) U.S. Cl.
CPC ........ *G07C 9/00896* (2013.01); *G07C 9/00182* (2013.01); *G07C 9/00103* (2013.01); *G07C 2009/00365* (2013.01)

(58) Field of Classification Search
CPC ................. G07C 9/00309; G07C 2009/00793; G07C 9/00896; G07C 9/00182; G07C 9/00103; G07C 2009/00365; B60R 25/04
USPC .......... 340/5.2, 5.6, 5.72, 5.7, 5.1, 5.21, 5.71, 340/5.73, 5.74
See application file for complete search history.

(56) References Cited

U.S. PATENT DOCUMENTS

| | | | | |
|---|---|---|---|---|
| 4,162,449 | A * | 7/1979 | Bouyssounouse et al. | 455/521 |
| 4,779,090 | A * | 10/1988 | Micznik et al. | 340/5.26 |
| 5,723,911 | A * | 3/1998 | Glehr | 340/10.5 |
| 5,831,533 | A | 11/1998 | Kanno | |
| 6,346,886 | B1 * | 2/2002 | De La Huerga | 340/573.1 |
| 6,570,486 | B1 * | 5/2003 | Simon et al. | 340/5.1 |
| 7,196,610 | B2 * | 3/2007 | Straumann et al. | 340/5.61 |
| 2002/0180582 | A1 | 12/2002 | Nielsen | |
| 2003/0043018 | A1 * | 3/2003 | Gerstenkorn | 340/5.61 |
| 2004/0110508 | A1 * | 6/2004 | Haartsen | 455/445 |
| 2004/0178882 | A1 | 9/2004 | Roz et al. | |
| 2005/0168321 | A1 * | 8/2005 | Fitzgibbon | 340/5.53 |

FOREIGN PATENT DOCUMENTS

| | | | |
|---|---|---|---|
| DE | 198 38 129 | A1 | 2/2000 |
| DE | 102 46 663 | A1 | 4/2004 |
| EP | 1 4244 861 | A1 | 6/2004 |

(Continued)

*Primary Examiner* — Jennifer Mehmood
*Assistant Examiner* — Yong Hang Jiang
(74) *Attorney, Agent, or Firm* — Fraser Clemens Martin & Miller LLC; William J. Clemens

(57) ABSTRACT

A method of controlling access to an area accessible by persons, particularly to a space closed by a door, utilizes a first mobile communications unit on which at least one access code is filed and a receiver unit for receiving the access code. In a first variant of the method, when an activation signal is transmitted by the communications unit within a predetermined range of the receiver unit, the receiver unit is activated and the access code is transmitted from the communications unit to the receiver unit. After a successful check of the access code by the receiver unit the access is freed. In a second variant, when the activation signal is transmitted by the receiver unit within a predetermined range of the communications unit, the receiver unit is activated. The access code is subsequently transmitted from the communications unit to the receiver unit and after a successful check of the access code by the receiver unit the access is freed.

19 Claims, 2 Drawing Sheets

(56) References Cited

FOREIGN PATENT DOCUMENTS

| | | | |
|---|---|---|---|
| FR | 2 843 256 | A | 2/2004 |
| JP | 2004-132028 | A | 4/2004 |
| JP | 2005-072972 | A | 3/2005 |
| WO | WO 2005/054609 | A1 | 6/2005 |

* cited by examiner

METHOD OF CONTROLLING ACCESS TO AN AREA

BACKGROUND OF THE INVENTION

The present invention relates to a method of controlling access to an area accessible by persons, particularly to a space closed by a door. For performance of the method there is provided a mobile communications unit, on which at least one access code is filed, and a receiver unit for receiving the access code. The access code is transmitted from the communications unit to the receiver unit. The receiver unit thereupon checks the access code and frees the access if the check is successful.

In the case of modern access control systems use is frequently made, for identification of persons, of contactlessly operating RFID (Radio Frequency Identification) systems. An RFID system of that kind comprises a transponder and a mobile or stationary RFID reader. If an RFID reader transmits a radio signal and the transponder, which substantially consists of a microchip and an antenna, is disposed in the vicinity, i.e. at a spacing from a few centimeters to some meters, the transponder responds and communicates the data stored thereon, for example an access code, to the reading station. RFID systems of that kind are frequently used in destination call terminals of elevator installations. However, in that case the disadvantage exists that the RFID systems have to permanently radiate an electromagnetic field for establishing contact with the transponder and thus they consume a comparatively large amount of electrical energy.

An elevator installation with a recognition system for recognition of a call issued on a floor is known from European patent EP 0 699 617 B1. This call is supplied to a control unit which determines an elevator by means of an allocation algorithm and informs the user of this elevator. The recognition devices, which are each arranged in stationary position in the access region to the elevators on the respective floor and which are also termed destination call terminals, permanently radiate an electromagnetic field. As soon as an information transmitter carried by the user comes into the electromagnetic field the information transmitter is awakened as a consequence of the electromagnetic field and transmits the data stored thereon, such as, for example, an identification code, to the recognition device.

However, in the afore-described elevator installation the disadvantage results that the recognition devices located at the individual floors permanently radiate an electromagnetic field in order to make it possible to establish contact with the information transmitter.

SUMMARY OF THE INVENTION

The present invention is based on the object of so developing a method of controlling access to a region accessible by persons that it needs a lesser amount of energy consumption by comparison with conventional methods.

According to the present invention for fulfillment of this task in the case of a method of controlling access to a region accessible by persons, particularly to a space closed by a door, it is provided in correspondence with the method comprising the following steps:

a) transmitting an activation signal by the communications unit within a predetermined range;

b) activating the receiver unit when the receiver unit is located within the range of the activation signal and receives the activation signal;

c) transmitting the access code from the communications unit to the receiver unit;

d) checking the access code by the receiver unit; and e) freeing the access if the check is successful.

Beyond this, for fulfillment of the above-mentioned object there is proposed a method comprising the following steps:

a) transmitting an activation signal by the receiver unit within a predetermined range;

b) activating the receiver unit when the communications unit is located within the range of the activation signal and receives the activation signal;

c) transmitting the access code from the communications unit to the receiver unit;

d) checking the access code by the receiver unit; and e) freeing the access if the check is successful.

The two afore-mentioned forms of embodiment of the method according to the present invention are based on the recognition that an energy saving can indeed be achieved if the receiver unit can be temporarily shifted from a deactivated state to an activated state and vice versa.

The two variants of the method according to the present invention make it possible for the current supply of the receiver unit to be substantially reduced by comparison with conventional methods. The reason for this is primarily based on the fact that the energy supply is controlled in dependence on the frequenting of the access control of the closed region. In this manner if a region accessible by persons, particularly a building or a room within this building, is not used over a longer period of time and thereby the receiver unit remains in its deactivated state over a longer period of time a reduction in the power requirement is achieved.

Moreover, it has proved advantageous that conventional mobile telephones are usable for performance of the method, so that the user is not obliged to carry, apart from his or her mobile telephone, any further communications unit.

A method is provided by the present invention which is preferably used for access control of elevators and buildings, offices, dwellings and individual rooms in regions of that kind accessible by persons. For transmission of the data in the form of code sequences, which apart from the access code can contain further data, use is preferably made of a wireless, radio-based communication between the units. The term "unit" is to be understood in the sense of the present invention as a generic expression for the communications unit(s) and the receiver unit.

Preferably, a near-field communications system is provided as communications network. This means that the communication between the respective units is possibly only within a near field. In this connection the Bluetooth or the NFC standard is used as preferred transmission standard. In this manner it can be ensured that no unauthorized access to the communications network takes place with possible spying on access codes.

In an advantageous development it is provided that the activation signal is transmitted by activation of a switch. This measure enables a further reduction in the power supply, since the energy needed for transmission of the activation signal is required only after actuation of the switch. The switch can on the one hand be provided in the region of the receiver unit, for example in the region of a door, and thus be actuated by the user in case of need. For actuation of the switch it can be sufficient, for example, for a pressure-dependent or temperature-dependent sensor to be activated and thereby the switch actuated. On the other hand, the switch can also be associated with the mobile communications unit, for example a mobile telephone, and be actuated by pressing a button or by a spoken command.

In a development of the method according to the present invention it is proposed that the receiver unit is deactivated after freeing the access. This enables a possible reduction in power supply and is particularly suitable for less-frequented regions.

In an advantageous development of the method it is provided that the access code is transmitted only when the communications unit is located within the range. The range is preferably less than 5 meters, expediently less than 1 meter. Thus, for example, the access code can be transmitted from the communications unit to the receiver unit only when the two units are held close to one another, for example at a spacing of a few centimeters. Conventional interfaces, for example infrared interfaces, can be used for a wireless, radio-based data transmission of that kind and, in particular, the Bluetooth standard can be used as transmission standard.

It is further of advantage if the access code is transmitted only within a predetermined time period. It is thereby prevented that the transmission process of the access code has to be ended by the user and that unauthorized persons can possibly gain access. In this connection it has further proved to be advantageous if the access is freed only within a predetermined time period. Thus, it can be established that the access is blocked, for example, after a minute so as to not offer the possibility of access to possibly following non-authorized persons.

DESCRIPTION OF THE DRAWINGS

The above, as well as other, advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
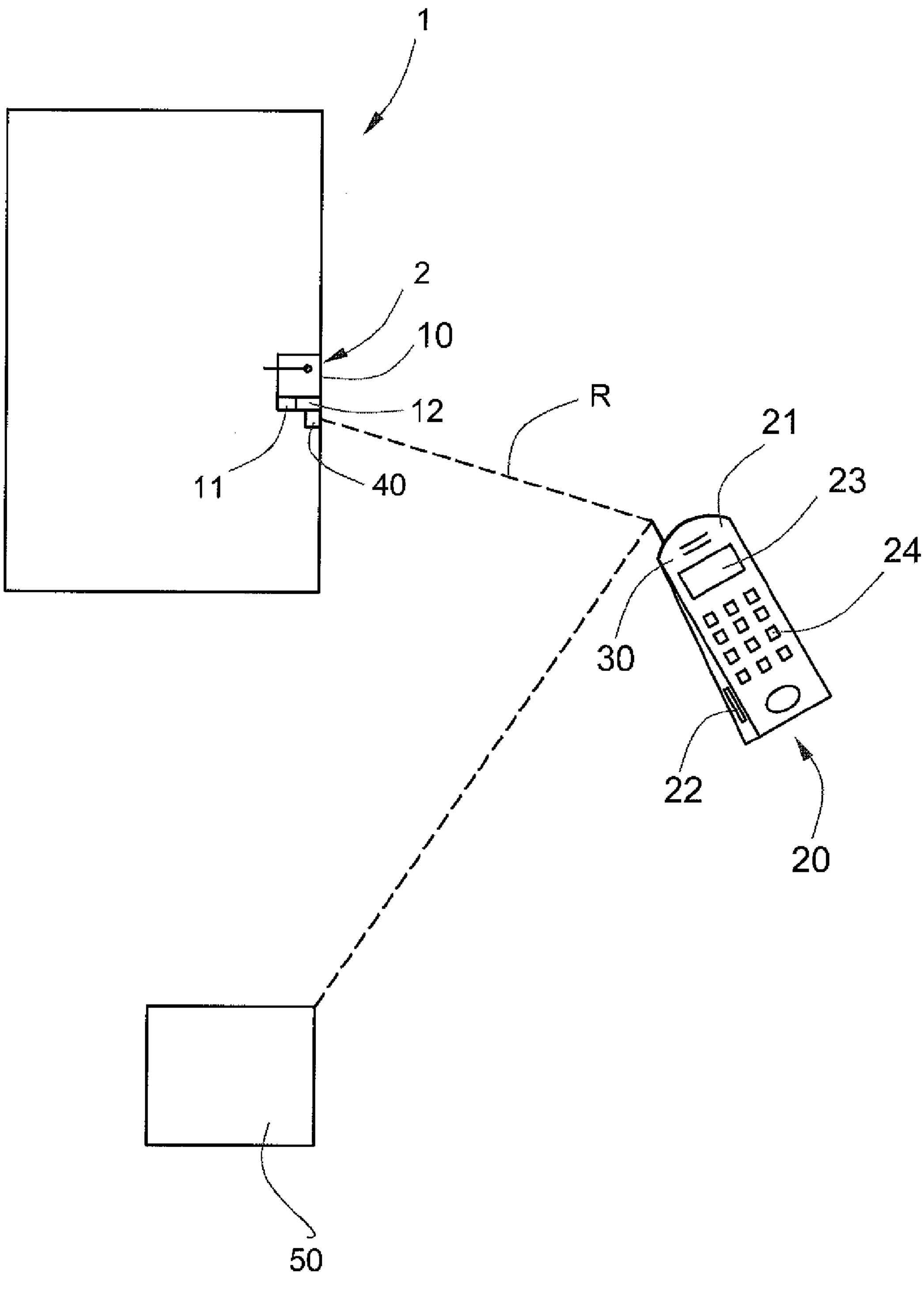
FIG. 1 is a schematic view of an access control system for performance of a first variant of the method according to the present invention.
Figure 2:
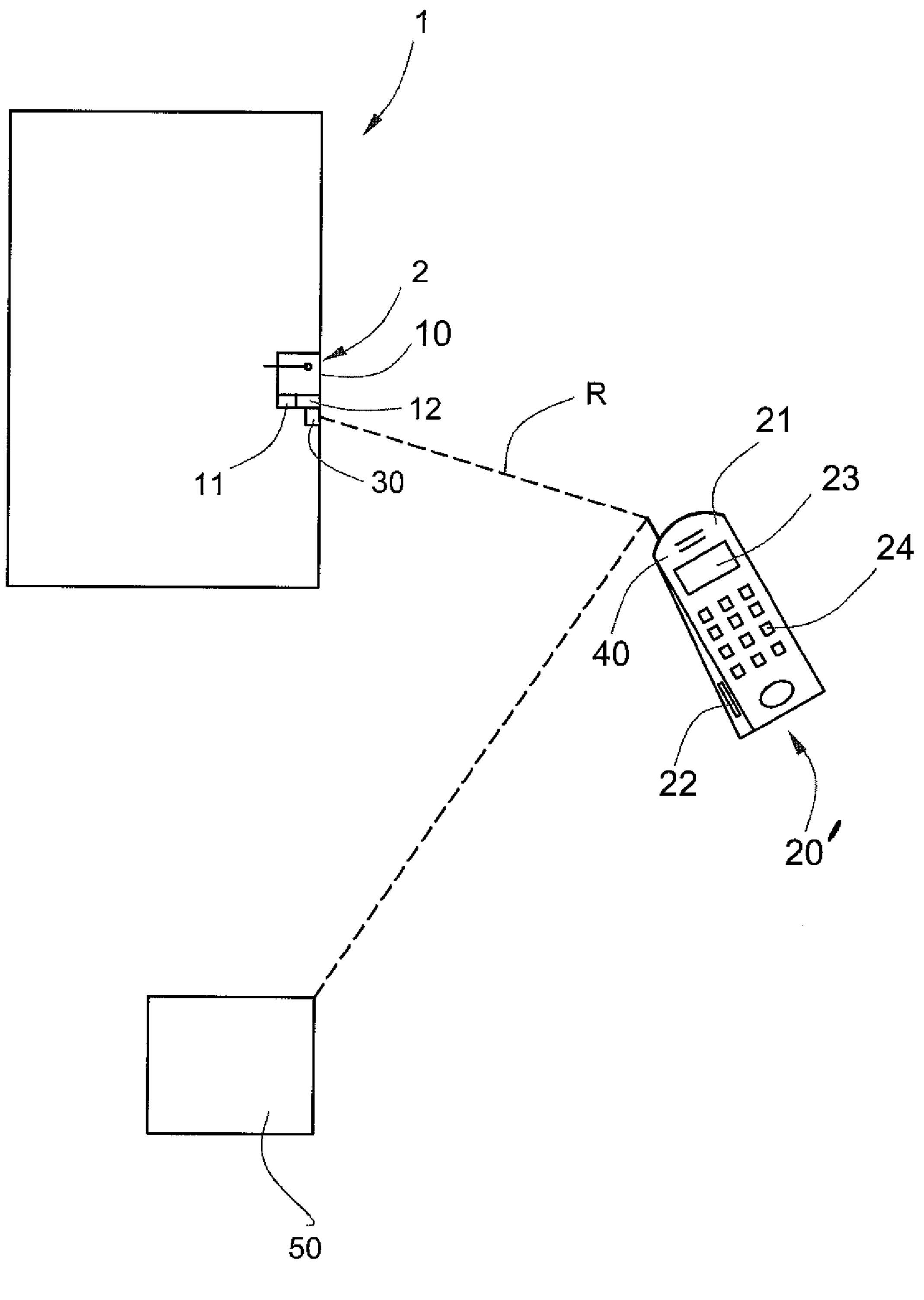
FIG. 2 is a schematic view an access control system for performance of a second variant of the method according to the present invention.

FIGS. 1 and 2 schematically show an access control system for a space closed by a door 1. The door 1 is equipped with an electronic door lock 2 and a receiver unit 10, which comprises a memory unit 11 and an interface 12. The access control system further comprises a central computer unit 50 and a mobile communications unit in the form of a mobile telephone 20, 20' which comprises a memory unit 21, an interface 22, a display 23 and a keyboard 24. For release of the door lock 2 there is required an electronic key in the form of an access code which is generated by the central computer unit 50 and transmitted wirelessly or by way of wire to the mobile telephone 20, 20' and filed in the memory unit 21 thereof.

For carrying out a first variant of the method for controlling access to the door 1 the access control system shown in FIG. 1 comprises an RFID transmitter part 30 associated with the mobile telephone 20 and an RFID receiver part 40 associated with the receiver unit 10. The RFID transmitter part 30 transmits an activation signal within a predetermined range R at predetermined times. In the present case the range width R is up to approximately a meter. The RFID receiver part 40 is equipped for reception of the activation signal. This means that when a user carries the communications unit 20 within a building and is located in the region of the door 1 the activation signal transmitted by the RFID transmitter part 30 is then received by the RFID receiver part 40 when the mobile telephone 20 and thus the user are located at a distance of less than a meter from the receiver unit 10 of the door 1. If the REID receiver part 40 has received the activation signal without interruption over a predetermined period of time a control signal for activation of the receiver unit 10 is transmitted. This control signal has the effect that the power supply of the door lock 2 is switched on. In order to enable this the receiver unit 10 is provided with an additional circuit. As a next step the mobile telephone 20 transmits the access code, which is filed in the memory unit 21, by way of its interface 22 by means of a wireless data communication to the receiver unit 10 with use of the Bluetooth standard. The receiver unit 10 receives the access code by way of its interface 12 and compares this with an original access code filed in the memory unit 11. In the case of agreement of the original access code with the received access code, i.e. after a successful check the receiver unit 10 transmits a control signal to the door lock 2 for opening, whereby access to the door 1 is freed.

The access control system shown in FIG. 2 serves for carrying out a second variant of the method and differs from the access control system according to FIG. 1 in that the RFID transmitter part 30 is associated with the receiver unit 10 and the RFID receiver part 40 is associated with the communications unit 20'. By virtue of this association the receiver unit 10 transmits the activation signal within the predetermined range R. Correspondingly, the mobile telephone 20' carried by the user is equipped by means of the RFID receiver part 40 to receive the activation signal. The reception is again possible only when the mobile telephone 20' and thus the user are located with the range R, i.e. at a spacing of less than a meter from the door lock 2. As soon as the RFID receiver part 40 receives the activation signal at least over the predetermined period of time, a control signal is generated and the receiver unit 10 is activated by switching on the power supply. The remaining method steps required for freeing the access correspond with the method steps already explained above in connection with the first variant of the method.

In order to take account of even the highest security demands it can be provided with both afore-described variants of the method that prior to transmission of the access code from the mobile telephone 20, 20' to the receiver unit 10 a PIN code interrogation is carried out by means of the mobile telephone 20, 20'.

The described methods are primarily distinguished by the fact that activation of the receiver unit 10 and particularly the power supply thereof as well as the power supply of the locking mechanism of the door lock 2 take place only after reception of an activation signal transmitted by the mobile telephone 20 or the receiver unit 10. In that case a sufficient security is guaranteed particularly by the fact that the mobile telephone 20, 20' is usable only after a successful PIN code interrogation and transmission of the access code is possible in the same manner as the transmission of the activation signal only within a specific range R.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of controlling access to an area, comprising the following steps:

a. one of i) automatically transmitting an activation signal to an activation signal receiver directly connected to a mobile communications unit within a predetermined range from a transmitter directly connected to an access code receiver unit, the transmitter being active while the access code receiver unit is in a deactivated state, and ii) receiving the activation signal automatically transmitted from a transmitter directly connected to the mobile communications unit within the predetermined range using the activation signal receiver directly connected to the access code receiver unit, the activation signal receiver being active while the access code receiver unit is in the deactivated state;

b. activating the access code receiver unit to an activated state from the deactivated state with a control signal from the activation signal receiver to an additional circuit of the access code receiver unit to switch on a power supply for freeing access to the area when the mobile communications unit is located within the predetermined range of the activation signal and the activation signal is received, wherein the access code receiver unit in the activated state is powered and the access code receiver unit in the deactivated state is unpowered;

c. receiving at least one access code from the mobile communications unit using the access code receiver unit when the access code receiver unit has been activated;

d. checking the at least one access code with the access code receiver unit; and e. freeing the access to the area if the check is successful.

2. The method according to claim 1 including, in the case of ii), placing the transmitter at the mobile communications unit and placing the activation signal receiver at the access code receiver unit prior to transmitting the activation signal within the predetermined range from the mobile communications unit.

3. The method according to claim 1 including, in the case of i), placing the transmitter at the access code receiver unit and placing the activation signal receiver at the mobile communications unit prior to transmitting the activation signal within the predetermined range from the receiver unit.

4. The method according to claim 1 wherein the access code receiver unit is deactivated after freeing the access.

5. The method according to claim 1 wherein the at least one access code is transmitted only when the mobile communications unit is located within the range.

6. The method according to claim 1 wherein the at least one access code is transmitted only within a predetermined time period.

7. The method according to claim 1 wherein the access is freed only within a predetermined time period.

8. The method according to claim 1 wherein the at least one access code is cancelled after a predetermined number of uses for freeing the access.

9. The method according to claim 1 wherein a computer unit generates the at least one access code and communicates the at least one access code to the mobile communications unit.

10. The method according to claim 9 wherein the at least one access code has at least one attribute which is variable by the computer unit or by the mobile communications unit.

11. The method according to claim 1 wherein the mobile communications unit comprises one of a mobile telephone and a PDA.

12. A method of controlling access to an area comprising the following steps:

a. receiving an activation signal automatically transmitted from a transmitter directly connected to a mobile communications unit at an activation signal receiver directly connected to an access code receiver unit, the activation signal receiver being active while the access code receiver unit is in a deactivated state, the activation signal causing a generation of a control signal from the activation signal receiver to activate the access code receiver unit to an activated state from the deactivated state for freeing access to the area, wherein the access code receiver unit in the activated state is powered and the access code receiver unit in the deactivated state is unpowered; and b. transmitting the at least one access code from the mobile communications unit to the access code receiver unit.

13. The method according to claim 12 including a step of switching the access code receiver unit to the deactivated state after performing the step b.

14. The method according to claim 12 including switching on a power supply of the access code receiver unit in the activated state and switching off the power supply in the deactivated state.

15. An elevator system including at least one elevator comprising:

an access code receiver unit having one of i) a transmitter part thereof for automatically transmitting an activation signal to an activation signal receiver directly connected to a mobile communications unit within a predetermined range from the access code receiver unit, the transmitter being active while the access code receiver unit is in a deactivated state, and ii) the activation signal receiver part thereof for receiving the activation signal automatically transmitted from the transmitter directly connected to the mobile communications unit within the predetermined range, the activation signal receiver being active while the access code receiver unit is in the deactivated state;

the access code receiver unit being activated to an activated state from the deactivated state by a control signal from the activation signal receiver to an additional circuit of the access code receiver unit to switch on a power supply when the mobile communications unit is within the predetermined range of the access code receiver unit, wherein the access code receiver unit in the activated state is powered and the access code receiver unit in the deactivated state is unpowered; and a door lock controlling access to the at least one elevator wherein the access code receiver unit in response to being activated and receiving an access code from the mobile communications unit is configured to actuate the door lock to free access to the at least one elevator.

16. An access-control device for controlling access to an area comprising a mobile communications unit having a transmitter part thereof configured to transmit an activation signal for reception by an activation signal receiver directly connected to an access code receiver unit, the activation signal receiver being active while the access code receiver unit is in a deactivated state, a control signal generated from the activation signal receiver to activate the access code receiver unit to an activated state from the deactivated state by applying power after the activation signal receiver receives the activation signal, wherein the access code receiver unit in the activated state is powered and the access code receiver unit in the deactivated state is unpowered, the mobile communications unit being configured to transmit an access code to the access code receiver unit, wherein the access code receiver unit, when activated, responds to the access code to grant access to an associated area.

17. An access-control device for controlling access to an area comprising:

one of i) a receiver unit having a transmitter part thereof configured to automatically transmit an activation signal to a receiver directly connected to a mobile communications unit, the transmitter being active while the receiver unit is in a deactivated state, and ii) the receiver unit having the receiver part thereof to receive the activation signal automatically transmitted from the transmitter directly connected to the mobile communications unit, the receiver being active while the receiver unit is in the deactivated state;

a control signal generated to an additional circuit of the receiver unit to switch on a power supply to activate the receiver unit to an activated state from the deactivated state after the receiver receives the activation signal, the receiver unit, when activated, being configured to respond to an access code received from the mobile communications unit to generate an other control signal, wherein the receiver unit in the activated state is powered and the receiver unit in the deactivated state is unpowered; and an electronic door lock connected to the receiver unit and being configured to respond to the other control signal from the receiver unit for freeing access to an associated door.

18. An area access control method comprising:

receiving with an activation signal receiver directly connected to an access code receiver unit an automatically wirelessly transmitted activation signal from a transmitter directly connected to a mobile communications device, the activation signal receiver being active while the access code receiver unit is in a deactivated state;

as a result of receiving the activation signal, activating the access code receiver unit to an activated state from the deactivated state with a control signal from the activation signal receiver, wherein the access code receiver unit in the activated state is powered and the access code receiver unit in the deactivated state is unpowered;

receiving, using the access code receiver unit in the activated state, at least one access code from the mobile communications device; and granting area access based at least in part on the at least one access code.

19. An access-control device for controlling access to an area comprising a mobile communications unit having an activation signal receiver part thereof configured to receive an activation signal from a transmitter directly connected to an access code receiver unit, the transmitter being active while the access code receiver unit is in the deactivated state, a control signal generated from the activation signal receiver to activate the access code receiver unit to an activated state from the deactivated state by applying power after the activation signal receiver receives the activation signal, wherein the access code receiver unit in the activated state is powered and the access code receiver unit in the deactivated state is unpowered, the mobile communications unit being configured to transmit an access code to the access code receiver unit, wherein the access code receiver unit, when activated, responds to the access code to grant access to an associated area.

* * * * *